United States Patent [19]

Inaba et al.

[11] Patent Number: 5,728,454
[45] Date of Patent: Mar. 17, 1998

[54] MAGNETIC RECORDING MEDIUM

[75] Inventors: Hiroo Inaba; Toshiharu Takeda; Noburo Hibino, all of Kanagawa, Japan

[73] Assignee: Fuji Photo Film Co., Ltd., Kanagawa, Japan

[21] Appl. No.: 421,214

[22] Filed: Apr. 7, 1995

[30] Foreign Application Priority Data

Apr. 7, 1994 [JP] Japan ................... 6-069711

[51] Int. Cl.$^6$ .................................................. G11B 5/66
[52] U.S. Cl. .......................... 428/212; 428/213; 428/214; 428/216; 428/217; 428/336; 428/694 B; 428/694 BS; 428/694 BN; 428/694 BM; 428/694 SL; 428/694 BB; 428/694 ST; 428/900; 427/128; 427/131; 427/132
[58] Field of Search ................... 428/694 B, 694 BS, 428/694 BN, 694 BM, 694 SL, 336, 900, 694 BB, 694 ST, 217, 212; 427/213, 214, 216, 128, 131, 132

[56] References Cited

U.S. PATENT DOCUMENTS 5,340,635  8/1994  Isobe et al. ................... 428/141
5,364,684  11/1994  Sakamoto et al. ................... 428/141

*Primary Examiner*—Leszek Kiliman
*Attorney, Agent, or Firm*—Sughrue, Mion, Zinn, Macpeak & Seas, PLLC

[57] ABSTRACT

A magnetic recording medium comprising on a non-magnetic support having thereon, in this order, an adhesive layer comprising a polymer, an undercoating layer comprising an inorganic powder and a binder, and one or more upper magnetic layers each comprising at least a ferromagnetic powder and a binder, the thickness of the upper magnetic layer being in the range of 0.05 to 1.0 μm, the thickness of the undercoating layer being in the range of 0.5 to 5.0 μm, the total thickness of the magnetic recording medium is in the range of 4 to 10 μm, the micro vickers hardness of the non-magnetic support being in the range of 75 to 100 kg/mm$^2$, and the micro vickers hardness of the undercoating layer being in the range of 25 to 50 kg/mm$^2$.

19 Claims, No Drawings

MAGNETIC RECORDING MEDIUM

FIELD OF THE INVENTION

The present invention relates to a magnetic recording medium and more particularly to a magnetic recording medium having a total thickness of as very small as 4 to 10 μm. Still more particularly, the present invention relates to a coating type magnetic recording medium having a good adhesion between the magnetic layer and the non-magnetic support which exhibits good electromagnetic characteristics.

BACKGROUND OF THE INVENTION

Magnetic recording media are widely used as recording tape, video tape, computer tape, disc, etc. The recording density of magnetic recording media have become higher and higher, and their recordable wavelength has become shorter and shorter every year. As the recording system for such magnetic recording media there have been studied analog system as well as digital system. In particular, studies have been made for the enhancement of the volumetric density of magnetic tape by reducing the thickness thereof to increase the maximum tape length windable in a predetermined cassette case. For example, the initial commercial version of the 8-mm video tape had a thickness of 13.5 μm and could record or reproduce for 80 minutes at maximum. The recent version of the 8-mm video tape has a thickness of 8 μm and can record or reproduce for 180 minutes at maximum.

In order to keep a good running durability against the reduction of the tape thickness, efforts have been made to enhance the strength of magnetic layers and non-magnetic supports. JP-A-55-1639 (The term "JP-A" as used herein means an "unexamined published Japanese patent application"), JP-A-55-1640, JP-A-55-1641, JP-A-55-1642, JP-A-55-1643, JP-A-55-1644, JP-A-55-1645, JP-A-55-1646 propose that a polyamide is used as a non-magnetic support to assure an improved strength against the reduction of the thickness of tape or non-magnetic support and the binder formulations in the magnetic layer are properly selected to improve the adhesion. However, since the kind of the binder contained in the magnetic layer is limited in this method, the dispersion of ferromagnetic powder in the binder is not always optimum. Therefore, the packing of the ferromagnetic powder is reduced, making it impossible to obtain a sufficient saturated magnetic flux density.

JP-B-2-51463 (The term "JP-B" as used herein means an "examined Japanese patent publication") defines the elasticity modulus of an aromatic polyamide having a specific chemical structure to improve its adhesion to a thin film of ferromagnetic metal. However, the resulting adhesion is not sufficient from the standpoint of practicability in the coating type media. JP-A-5-62154 proposes that a binder free of vinyl acetate is used to improve the adhesion to an aromatic polyamide. However, this approach cannot provide a sufficient running durability.

JP-A-5-114129 proposes that an aromatic polyamide is used as a non-magnetic support and the thickness of the magnetic layer and back layer are defined to improve the smoothness in the contact of the tape with the head. However, this approach is disadvantageous in that a very thin magnetic layer must be applied, causing coating defects that reduces the yield.

The present inventors proposed a magnetic recording medium which can be produced in a high yield free from coating defects and exhibits improved reproduced output, electromagnetic characteristics such as C/N ratio and running durability by employing a simultaneous multi-layer coating process as disclosed in JP-A-63-191315 and JP-A-63-187418 so that the application of a non-magnetic layer as an undercoating layer is followed by the application of an upper magnetic layer containing a ferromagnetic powder while the undercoating layer is wet. There have been made many proposals that a two-layer magnetic layer can be used to improve electromagnetic characteristics and running durability. Among them, JP-A-1-205724 proposes that the molecular weight of a polyurethane to be contained in the undercoating layer and the feature of the molecular weight of a polyurethane to be contained in the upper magnetic layer can be defined to improve the adhesion. However, a magnetic recording medium having a total thickness of as very small as not more than 10 μm can hardly attain a proper balance between running durability and adhesion or electromagnetic characteristics.

Further, JP-A-5-298658 discloses a magnetic recording medium comprising a plurality of layers formed on a non-magnetic support wherein the vickers hardness of the uppermost magnetic layer is from not less than 40 to less than 200 and at least one of the layers other than the uppermost layer comprises a non-magnetic powder or high permeability material. The detailed description of the specification says that the vickers hardness of the layers other than the uppermost layer is preferably in the range of 30 to 100. Thus, the relationship between the vickers hardness of the conventional uppermost magnetic layer and that of the layers other than the uppermost magnetic layer is defined. However, a polyethylene terepthalate film is used as a non-magnetic support as described in the examples. This constitution is disadvantageous in that if the total thickness of the magnetic recording medium falls below 10 μm, powder peeling or suspension of running can easily occur. In order to enhance the rigidity of the non-magnetic support, a material such as polyamide may be used. Such a material has a poor adhesion to the undercoating layer and thus cannot be put into sufficiently practical use.

The inventors made extensive studies to reduce the total thickness of the magnetic recording medium to 4 to 10 μm. As a result, an approach was attained for securing a sufficient adhesive strength while improving the running durability against the reduction of the tape thickness. In particular, it was found that remarkable improvements can be provided by a magnetic recording medium comprising an adhesive layer mainly composed of a polymer, a coating layer having an inorganic powder and a binder dispersed therein, and at least one magnetic layer provided on a non-magnetic support in this order, characterized in that the thickness of said upper magnetic layer is in the range of 0.05 to 1.0 μm, the thickness of said undercoating layer is in the range of 0.5 to 5.0 μm, and the micro vickers hardness of said non-magnetic support and undercoating layer are defined to a predetermined value. Thus, the present invention has been worked out.

SUMMARY OF THE INVENTION

It is therefore an object of the present invention to provide a magnetic recording medium having good electromagnetic characteristics.

It is another object of the present invention to provide a magnetic recording medium which suffers from little edge damage due to repeated running, showing an excellent running durability, and exhibits a good adhesion between the magnetic layer and the non-magnetic support that causes little powder peeling and hence little dropouts.

These and other objects of the present invention will become more apparent from the following detailed description and examples.

The present invention relates to a magnetic recording medium comprising on a non-magnetic support having thereon, in this order, an adhesive layer comprising a polymer, an undercoating layer comprising an inorganic powder and a binder, and one or more upper magnetic layers each comprising at least a ferromagnetic powder and a binder, the thickness of the upper magnetic layer being in the range of 0.05 to 1.0 µm, the thickness of the undercoating layer being in the range of 0.5 to 5.0 µm, the total thickness of the magnetic recording medium is in the range of 4 to 10 µm, the micro vickers hardness of the non-magnetic support being in the range of 75 to 100 kg/mm$^2$, and the micro vickers hardness of the undercoating layer being in the range of 25 to 50 kg/mm$^2$.

DETAILED DESCRIPTION OF THE INVENTION

Preferred embodiments of the present invention include the following:

(1) A magnetic recording medium as defined above, wherein the inorganic powder contained in the undercoating layer comprises a ferromagnetic powder.

(2) A magnetic recording medium as defined above, wherein the inorganic powder contained the undercoating layer comprises a non-magnetic metal oxide.

(3) A magnetic recording medium as defined above, wherein the ferromagnetic powder contained in the undercoating layer is Co-modified γ-iron oxide.

(4) A magnetic recording medium as defined above, wherein the non-magnetic metal oxide contained in the undercoating layer is at least one selected from the group consisting of rutile titanium dioxide, anatase titanium dioxide, amorphous titanium dioxide, α-iron oxide, zinc oxide, and barium sulfate.

(5) A magnetic recording medium as defined above, wherein the non-magnetic support is composed of an aromatic polyamide.

(6) A magnetic recording medium as defined above, wherein the undercoating layer and at least the magnetic layer adjacent thereto are formed by the wet-on-wet coating method.

The present invention is considered to be worked out by the following mechanism of effect of constituent elements:

(a) The first feature of the present invention is that the thickness of the magnetic layer is in the range of 0.05 to 1 µm. This is because that the thinner the magnetic layer is, the less are the self-demagnetization less and recording demagnetization loss, that is, the higher is the output, in the short wave recording. Further, the thinner the magnetic layer is, the higher is the percent erasability, that is, the higher is the overwritability.

(b) The second feature of the present invention is that an adhesive layer mainly composed of a polymer is provided. This adhesive layer is adapted to improve the adhesion between the non-magnetic support and the undercoating layer. This adhesive layer may comprise a polyester polyurethane, polyether polyurethane, polyester, butadiene-acrylonitrile copolymer, styrene-butadiene copolymer, rubber resin or the like, with polyester and polyester polyurethane being preferably used. The molecular weight of these resins is preferably 3,000 to 100,000. If necessary, these resins may contain at least one of polar groups selected from a sulfonic acid group, a phosphoric acid group, a phosphate group, and a sulfate group. The glass transition temperature (Tg) of these resins is preferably −30° to 50° C. The adhesive layer may contain a plasticizer, a releasing agent, and inorganic powder to prevent adhesion of the polymers. These features of the adhesive layer are described in JP-A-5-54365 and JP-A-4-319514, and other features described therein can also be applied to the adhesive layer in the present invention.

(c) The third feature of the present invention is that a non-magnetic support having a micro vickers hardness of 75 to 100 kg/mm$^2$, preferably 80 to 100 kg/mm$^2$ is used. This is because when the total thickness of the magnetic recording medium is not more than 10 µm, it can easily suffer from edge damage that causes powder peeling or suspension of running during running in the deck, necessitating the use of a non-magnetic support having a high rigidity. A non-magnetic support having a high rigidity exhibits a poor adhesion and thus easily allows the peeling of the coating layer or magnetic layer that causes a rise in the generation of dropouts. Too high a rigidity makes it impossible to provide a smooth sliding movement with respect to the video head. Thus, a good envelope wave cannot be often obtained. In order to eliminate these difficulties, an undercoating layer having a micro vickers hardness of 25 to 50 kg/mm$^2$, preferably 30 to 45 kg/mm$^2$ as described later can be provided on a non-magnetic support having a micro vickers hardness of 75 to 100 kg/mm$^2$ to advantage.

(d) The fourth feature of the present invention is that an undercoating layer is provided. As mentioned above, the application of an undercoating layer having a micro vickers hardness of 25 to 50 kg/mm$^2$ to a non-magnetic support having a micro vickers hardness of as high as 75 to 100 kg/mm$^2$ provides a good adhesion that can inhibit the peeling of the coating layer or magnetic layer, giving a smooth movement with the magnetic head.

In order to adjust the micro vickers hardness of the undercoating layer to 25 to 50 kg/mm$^2$, it is effective to satisfy at least one of the following four requirements:

1. A binder and a carbon black having an average primary particle diameter of 15 to 40 nm and a DBP oil absorption of 50 to 300 ml/100 g are contained in an amount of 10 to 25 parts by weight and 3 to 20 parts by weight based on 100 parts by weight of the inorganic powder contained in the undercoating layer, respectively;

2. An abrasive having a Mohs hardness of 6 to 10 is contained in the undercoating layer in an amount of 5 to 20 parts by weight based on 100 parts by weight of the undercoating layer powder;

3. A low molecular organic substance having a molecular weight of not less than 1,000 is contained in the undercoating layer in an amount of 1 to 15 parts by weight based on 100 parts by weight of the undercoating layer powder; and 4. The amount of the binder to be contained in the undercoating layer is in the range of 15 to 30 parts by weight based on 100 parts by weight of the inorganic powder and PVC (pigment volume concentration) of the inorganic powder is in the range of 20 to 40%.

The measurement of the micro vickers hardness of the undercoating layer in the present invention is effected as follows:

The micro vickers hardness (hereinafter sometimes simply referred to as "vickers hardness") of a specimen to be measured is determined by means of a thin film hardness tester HMA-400 available from NEC Corp. The tip of the penetrator used is a triangular pyramid made of diamond with a tip sharpness of 80° and a tip radius of 0.1 µm. The measurement is effected at a maximum load of 0.2 g, an indentation rate of 1.4 nm/sec and an indentation depth of 0.1 to 1.0 µm. The force received by the penetrator as it penetrates into the specimen is measured. The load received by the penetrator is plotted against the square of the depth of indentation by the penetrator. An inflection point appears at the interface of the upper magnetic layer and the undercoating layer which differ from each other in hardness. The slope of the curve changes from one side of the inflection point to the other. The micro vickers hardness can be determined from this slope. The definition is as follows. The micro hardness HM and the micro vickers hardness HV can be given by the following equations:

$$HV = 54 \times (HM)^{0.8}$$

$$HM = W/3.298^2$$

where W is load; and δ is indentation depth. For details, reference can be made to "Hakumaku no rikigakuteki tokusei hyouka gijutu (Technique of evaluation of dynamic characteristics of thin film)", Realize Corp.

The micro vickers hardness of the undercoating layer may be measured by subjecting the non-magnetic support on which the undercoating layer alone has been provided to measurement. On the other hand, the measurement of the vickers hardness of the undercoating layer on a magnetic tape or the like as a product is effected as follows. In some detail, it is a common practice to lap the magnetic tape by a rotary grinding apparatus such as diamond wheel preferably at 100 to 10,000 rpm and a tension of 10 to 2,000 g/12.65 mm. The grinding apparatus is not limited to diamond wheel. The grinding apparatus may be properly selected from the group consisting of abrasive tape, Arkansas grinding wheel, etc. It is necessary that a specimen cut from the ground area of the upper magnetic layer be successively measured for magnetization by VSM until the elimination of magnetization is confirmed. Then, the vickers hardness of the material can be effected to provide an assured value of the vickers hardness of the undercoating layer.

The undercoating layer will be further described hereinafter.

The inorganic powder to be contained in the undercoating layer of the present invention may be either magnetic or non-magnetic. For example, the non-magnetic powder may be selected from the group consisting of inorganic compounds such as metal oxide, metal carbonate, metal nitride, metal carbide and metal sulfide. Examples of the inorganic compound include α-alumina having a percent α-conversion, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbide, calcium sulfate, barium sulfate and molybdenum sulfate, singly or in combination. Preferred among these inorganic compounds are titanium dioxide, zinc oxide, iron oxide and barium sulfate. Particularly preferred among these inorganic compounds is titanium dioxide. The average particle diameter of such a non-magnetic powder is preferably in the range of 0.005 to 2 µm. If necessary, non-magnetic powders having different average particle diameters may be used in combination. Alternatively, a single non-magnetic powder having a wide distribution of particle diameter may be used to exert the same effects. In a particularly preferred embodiment, the average particle diameter of non-magnetic powder is in the range of 0.01 to 0.2 µm. The tapped density of the non-magnetic powder is generally in the range of 0.05 to 2 g/ml, preferably 0.2 to 1.5 g/ml. The water content of the non-magnetic powder is generally in the range of 0.1 to 5% by weight, preferably 0.2 to 3% by weight. The pH value of the non-magnetic powder is generally in the range of 2 to 11, particularly 6 to 9. The specific surface area of the non-magnetic powder is generally in the range of 1 to 100 m²/g, preferably 5 to 50 m²/g, more particularly 7 to 40 m²/g. The crystalline size of the non-magnetic powder is preferably in the range of 0.01 to 2 µm. The oil absorption of the non-magnetic powder is generally in the range of 5 to 100 ml/100 g, preferably 10 to 80 ml/100 g, more preferably 20 to 60 ml/100 g as determined with DBP. The specific gravity of the non-magnetic powder is generally in the range of 1 to 12, preferably 3 to 6. The shape of the non-magnetic powder may be any of needle, sphere, polyhedron and tablet.

The ignition loss of the non-magnetic powder is preferably in the range of 0 to 20% by weight. The Mohs hardness of the inorganic powder used in the present invention is preferably in the range of 4 to 10. The roughness factor of the surface of the non-magnetic powder is preferably in the range of 0.8 to 1.5, more preferably 0.9 to 1.2. The inorganic powder generally exhibits an SA (stearic acid) absorption of 1 to 20 µmol/m², preferably 2 to 15 µmol/m². The non-magnetic powder to be contained in the undercoating layer preferably exhibits a heat of wetting by water of 200 erg/cm² to 600 erg/cm² at a temperature of 25° C. Alternatively, a solvent having a heat of wetting by water in the above defined range may be used. The optimum number of water molecules on the surface of the non-magnetic powder at a temperature of 100° to 400° C. is generally in the range of 1 to 10%/100 A. The pH value of the isoelectric point in water is preferably in the range of 3 to 6.

The surface of the non-magnetic powder is preferably treated with $Al_2O_3$, $SiO_2$, $TiO_2$, $ZrO_2$, $SnO_2$, $Sb_2O_3$ or ZnO, more preferably with $Al_2O_3$, $SiO_2$, $TiO_2$ or $ZrO_2$, particularly with $Al_2O_3$, $SiO_2$ or $ZrO_2$ in the light of dispersibility. These surface treating agents may be used singly or in combination. A surface-treated layer obtained by coprecipitation may be used depending on the purpose. Alternatively, the non-magnetic powder may be treated with alumina, followed by the treatment of the surface layer with silica, and vice versa. The surface-treated layer may be porous depending on the purpose. In general, the surface-treated layer is preferably homogeneous and dense.

Specific examples of the non-magnetic powder to be contained in the undercoating layer of the present invention include Nanotite (available from Showa Denko K.K.), HIT-100, ZA-G1 (available from Sumitomo Chemical Co., Ltd.), DPN-250, DPN-250BX, DPN-270BX (available from Toda Kogyo Corp.), TTO-51B, TTO-55A, TTO-55B, TTO-55C, TTO-55S, TTO-55D, SN-100, E270, E271 (available from Ishihara Sangyo Co., Ltd.), STT-4D, STT-30D, STT-30, STT-65C (available from Titan Kogyo K.K.), MT-100S, MT-100T, MT-150W, MT-500B, MT-600B, MT-100F, MT-500HD (available from Teika Co., Ltd.), FINEX-25, BF-1, BF-10, BF-20, ST-M (available from Sakai Chemical Industry Co., Ltd.), DEFIC-Y, DEFIC-R (available from Dowa Mining Co., Ltd.), AS2BM, TiO2P25 (available from Nihon Aerogel K.K.), 100A, 500A (available from Ube Industries, Ltd.), and Y-LOP (available from Titan Kogyo K.K.) and calcined product thereof.

A particularly preferred example of the non-magnetic powder is titanium dioxide. The process for the preparation of the non-magnetic powder will be further described, using for an example titanium dioxide. The preparation of titanium dioxide can be mainly accomplished by sulfate process or chlorine process.

In the sulfate process, ilumenite ore is digested with sulfuric acid to extract Ti, Fe, etc. as sulfates. Iron sulfate is then removed by crystallization. The residual titanyl sulfate solution is purified by filtration, and them thermally hydrolyzed to cause hydrous titanium hydroxide to be precipitated. The hydrous titanium hydroxide thus precipitated is filtered, and then washed. Impurities are removed by washing. A particle diameter adjustor or the like is then added to the material. The material is then calcined at a temperature of 80° to 1,000° C. to produce coarse titanium dioxide. The titanium dioxide is of rutile type or anatase type depending on the kind of nucleating agent added upon hydrolyzation. The coarse titanium dioxide may be ground, classified, and then subjected to surface treatment, etc. to produce the desired non-magnetic powder.

In the chlorine process, natural rutile or synthetic rutile is used as a starting material. It is chlorinated in a high temperature reduced condition so that Ti is converted to $TiCl_4$ and Fe is converted to $FeCl_2$. Iron oxide solidified by cooling is separated from the liquid $TiCl_4$. The resulting crude $TiCl_4$ is then purified by fractionating. To $TiCl_4$ is then added a nucleating agent. The reaction mixture is momentarily reacted with oxygen at a temperature of not lower than 1,000° C. to obtain crude titanium dioxide. The crude titanium dioxide produced by the oxidative decomposition process is then subjected to finishing in the same manner as in the sulfate process to serve as a pigment.

In the surface treatment, the foregoing titanium dioxide is dry-ground, wet-ground with water and a dispersant, and then subjected to centrifugal separation to remove coarse particles. The resulting fine slurry is transferred to the surface treatment tank where it is then coated with a metal hydroxide. In some detail, a predetermined amount of an aqueous solution of a salt such as Al, Si, Ti, Zr, Sb, Sn and Zn is prepared in the surface treatment tank. The aqueous salt solution is then neutralized with an acid or alkali to produce a hydrous oxide with which the surface of titanium dioxide particles is coated. The water-soluble salts by-produced are removed by decantation, filtration and washing. The slurry is adjusted for a proper pH, filtered, and then washed with pure water. The cake thus washed is then dried by a spray dryer or band dryer. The dried material is finally ground by a jet mill to provide a product. Instead of being treated in an aqueous system, the titanium dioxide powder may be subjected to surface treatment with Al or Si by passing $AlCl_3$ or $SiCl_4$ vapor through the powder, and then introducing water vapor thereinto. For the preparation of other pigments, reference can be made to G. D. Parfitt and K. S. W. Sing, "Characterization of Powder Surfaces", Academic Press, 1976.

A carbon black may be incorporated in the undercoating layer to obtain the known effect of reduction of surface resistivity (Rs) as well as provide a desired micro vickers hardness. To this end, furnace black for rubber, thermal black for rubber, acetylene black, etc. may be used.

The carbon black preferably exhibits a specific surface area of 100 to 500 $m^2/g$, more preferably 150 to 400 $m^2/g$, and an oil absorption of 20 to 400 ml/100 g, more preferably 30 to 200 ml/100 g as determined with DBP. The carbon black exhibits an average particle diameter of 5 to 80 mμ, more preferably 10 to 50 mμ, particularly preferably 10 to 40 mμ. The carbon black preferably exhibits a pH value of 2 to 10, a water content of 0.1 to 10% and a tapped density of 0.1 to 1 g/ml. Specific examples of the carbon black employable in the present invention include BLACKPEARLS 2000, 1300, 1000, 900, 800, 880, 700, VULCAN XC-72 (available from Cabot Corp.), #3050B, 3150B, 3250B, #3750B, #3950B, #950, #650B, #970B, #850B, MA-600 (available from Mitsubishi Kasei Corp.), CONDUCTEX SC, RAVEN 8800, 8000, 7000, 5750, 5250, 3500, 2100, 2000, 1800, 1500, 1255, 1250 (available from Columbia Carbon Corp.), and Ketchen Black EC (available from Aczo Corp.). These carbon blacks may be surface-treated with a dispersant, grafted with a resin or partially graphtized before use. These carbon blacks may be added to the magnetic coating in the form of dispersion in a binder. These carbon blacks may be used in an amount of 0 to 50% by weight based on the weight of the foregoing inorganic powder or 0 to 40% by weight based on the total weight of the non-magnetic layer. These carbon blacks may be used singly or in combination.

For the details of the carbon black employable in the present invention, reference can be made to "Handbook of Carbon Black", Carbon Black Kyokai, Japan (Nov. 25, 1971).

Further, an organic powder may be incorporated in the undercoating layer depending on the purpose. For example, acrylstyrene resin powder, benzoguanamine resin powder, melamine resin powder, and phthalocyanine pigment may be used. Further, polyolefin resin powder, polyester resin powder, polyamide resin powder, polyimide resin powder, and polyfluoroethylene resin may also be used. The preparation of these organic powders can be accomplished by the method as described in JP-A-62-18564 and JP-A-60-255827.

It is a common practice to provide an adhesive layer in an ordinary magnetic recording medium to enhance the adhesion between the support and the magnetic layer, etc. The thickness of the adhesive layer is normally in the range of 0.01 to 0.5 μm, preferably 0.02 to 0.3 μm.

The undercoating layer of the present invention may comprise a magnetic powder. Examples of the magnetic powder include $\gamma$-$Fe_2O_3$, Co-modified $\gamma$-$Fe_2O_3$, alloy mainly composed of $\alpha$-Fe, $CrO_2$ or the like. Particularly preferred among these magnetic powders is Co-modified $\gamma$-$Fe_2O_3$. The ferromagnetic powder to be contained in the undercoating layer of the present invention preferably has the same composition and properties as that to be contained in the upper magnetic layer. However, the properties should differ from the upper magnetic layer to the undercoating layer as is known. For example, in order to enhance the long wavelength recording characteristics of the magnetic recording medium, it is desirable that Hc of the undercoating layer is lower than that of the upper magnetic layer. Further, it is useful that Br of the undercoating layer is higher than that of the upper magnetic layer. Besides these arrangements, known multi-layers structures may be employed to provide the magnetic recording medium with more advantages.

For the binder, lubricant, dispersant, and additives to be incorporated in the undercoating layer and the method for dispersing these components and solvents used therefor, those used for the magnetic layer can be employed. In particular, for the amount and kind of the binder, additives and dispersant, the known technique for the magnetic layer can be employed.

The magnetic layer will be further described hereinafter.

As the ferromagnetic powder to be incorporated in the upper magnetic layer of the present invention there can be used a known ferromagnetic powder such as magnetic iron oxide FeO$_x$ (in which x=1.33 to 1.5) powder, Co-modified FeO$_x$ (in which x=1.33 to 1.5) powder, ferromagnetic alloy powder comprising α-Fe, Ni or Co as main component (75% or more), barium ferrite powder and strontium ferrite powder. Particularly preferred among these ferromagnetic powders is ferromagnetic alloy powder comprising α-Fe. Such a ferromagnetic powder may further contain other elements, such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Such a ferromagnetic powder may be treated with a dispersant, lubricant, surface active agent or antistatic agent as described later before dispersion. This is further described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, and JP-B-48-39639 (the term "JP-B" as used herein means an "examined Japanese patent publication"), and U.S. Pat. Nos. 3,026,215, 3,031,341, 3,100,194, 3,242,005, and 3,389,014.

Among the above mentioned ferromagnetic powders, the ferromagnetic alloy powder may contain a small amount of hydroxide or oxide. In order to prepare such a ferromagnetic alloy powder, known preparation methods can be used. These methods include a method which comprises the reduction with a composite organic acid salt (mainly oxalate) and a reducing gas such as hydrogen; a method which comprises the reduction of iron oxide with a reducing gas such as hydrogen to obtain Fe or Fe—Co particles; a method which comprises the pyrolysis of a metallic carbonyl compound; a method which comprises adding a reducing agent such as sodium borohydride, hypophosphite and hydrazine to an aqueous solution of a ferromagnetic metal to reduce the ferromagnetic metal; and a method which comprises the evaporation of a metal in an inert gas under reduced pressure to obtain a finely divided powder. The ferromagnetic alloy powder thus obtained may be subjected to a known deoxidation treatment such as a process which comprises dipping the ferromagnetic alloy powder in an organic solvent, and then drying the material; a process which comprises dipping the ferromagnetic alloy powder in an organic solvent with an oxygen-containing gas bubbled thereinto to form an oxide film on the surface of the ferromagnetic alloy powder, and then drying the material; and a process which comprises controlling the partial pressure of oxygen gas and inert gas instead of using an organic solvent to form an oxide film on the surface of the ferromagnetic alloy powder.

The ferromagnetic powder to be incorporated in the magnetic layer of the present invention preferably exhibits a specific surface area of 25 to 80 m$^2$/g, more preferably 40 to 70 m$^2$/g as determined by FET method. If the specific surface area falls below 25 m$^2$/g, the resulting magnetic recording medium suffers from a high noise. On the contrary, if the specific surface area exceeds 80 m$^2$/g, the desired surface properties cannot be easily obtained. The crystalline size of the ferromagnetic powder to be incorporated in the magnetic layer of the present invention is generally in the range of 100 to 450 Å, preferably 100 to 350 Å. The magnetic iron oxide powder preferably exhibits σs of 50 to 90 emu/g, preferably 70 to 90 emu/g. In the case of ferromagnetic metal powder, it is preferably in the range of 100 to 200 emu/g, more preferably 110 to 170 emu/g. The ferromagnetic powder preferably exhibits a coercive force of 1,100 Oe to 3,000 Oe, more preferably from 1,400 Oe to 2,500 Oe. The ferromagnetic powder preferably exhibits an acicular ratio of 4 to 18, more preferably 5 to 12. The ferromagnetic powder preferably exhibits a water content of 0.01 to 2%. The water content of the ferromagnetic powder is preferably optimized by the kind of the binder used in combination. The tapped density of γ-iron oxide is preferably in the range of 0.5 to 1.5 g/ml, more preferably 0.8 to 1.2 g/ml. In the case of ferromagnetic alloy powder, the tapped density is preferably in the range of 0.2 to 0.8 g/ml. If it exceeds 0.8 g/ml, the ferromagnetic powder can be easily oxidized during compaction, making it difficult to obtain sufficient saturated magnetization (σs). On the contrary, if it falls below 0.2 g/ml, the dispersibility of the ferromagnetic powder can be insufficient.

If γ-iron oxide is used, the ratio of the divalent iron to the trivalent iron is preferably in the range of 0 to 20%, more preferably 5 to 10%. The proportion of cobalt atom to iron atom is in the range of 0 to 15%, preferably 2 to 8%.

The pH value of the ferromagnetic powder is preferably optimized depending on the kind of the binder used in combination. The pH value of the ferromagnetic powder is generally in the range of 4 to 12, preferably 6 to 10. The ferromagnetic powder may be subjected to surface treatment with Al, Si, P or oxide thereof as necessary. The amount of such a surface treatment is in the range of 0.1 to 10%. The adsorption of a lubricant such as aliphatic acid by the ferromagnetic powder thus surface-treated is advantageously in the range of 100 mg/m$^2$. The ferromagnetic powder may contain soluble inorganic ions such as Na, Ca, Fe, Ni and Sr ions in some cases. If the content of such an inorganic ion is 500 ppm or less, there are no remarkable effects on the properties.

The ferromagnetic powder used in the present invention preferably has as small void as possible, i.e., 20 vol % or less, more preferably 0 to 5 vol %. The shape of the ferromagnetic particles may be selected from needle, grain, rice grain, tablet, etc. so as to satisfy the above mentioned requirements for average particle diameter. In the case of needle ferromagnetic powder, its acicular ratio is preferably in the range of 4 to 12. In order to attain SFD of the ferromagnetic powder to 0.1 to 0.6, the distribution of Hc in the ferromagnetic powder needs to be reduced. To this end, the particle size distribution of goethite may be improved. Further, γ-hematite may be prevented from being sintered. For cobalt-modified iron oxide, the rate of coating of cobalt may be lower than ever.

Examples of the hexagonal ferrite contained in the upper magnetic layer include substituted barium ferrite, substituted strontium ferrite, substituted lead ferrite, substituted calcium ferrite, and cobalt-substituted barium, strontium, lead and calcium ferrites, hexagonal cobalt powder, etc. Specific examples of such compositions include magnetoplanbite type barium ferrite, magnetoplanbite type strontium ferrite, and magnetoplanbite type barium and strontium ferrites partially comprising a spinel phase. Besides the predetermined atoms, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc. may be contained in the hexagonal ferrite. Preferred among these atoms are Al, Si, Ca, Cr, Y, Ba, Nd, Co, Mn, Ni and B. In general, a hexagonal ferrite comprising elements such as Co—Ti, Co—Ti—Zr, Co—Ti—Zn, Ni—Ti—Zn and Ir—Zn incorporated therein may be used. Particularly preferred among the foregoing hexagonal ferrites are Co-substituted barium ferrite and Co-substituted strontium ferrite. The upper magnetic layer preferably exhibits SFD (switching field distribution) of 0.1 to 0.7 in the longitudinal direction to provide a narrow distribution of coercive force. In order to control the coercive force, various approaches may be used. For example, the average particle diameter and the particle thickness may be uniformized; the thickness of spinel phase in the hexagonal ferrite may be kept constant; the amount of substituent elements to be incorporated in the spinel phase may be kept constant; and the substitution site in the spinel phase may be fixed.

The hexagonal system ferrite used in the present invention normally comprises hexagonal tabular particles. The average particle diameter indicates the width of the hexagonal tablet determined under electron microscope. In the present invention, the average particle diameter (tablet diameter) of the hexagonal system ferrite is preferably defined in the range of 0.01 to 0.2 µm, particularly 0.03 to 0.1 µm. The average thickness (tablet thickness) of the finely divided particles is preferably defined in the range of 0.001 to 0.2 µm, particularly 0.003 to 0.05 µm. The tabular ratio (average particle diameter/tablet thickness) of the finely divided particles is generally in the range of 1 to 15, preferably 3 to 7. The specific surface area ($S_{BET}$) of the finely divided hexagonal system ferrite particles is generally in the range of 25 to 100 m$^2$/g, preferably 40 to 70 m$^2$/g as determined by BET method. If the specific surface area is less than 25 m$^2$/g, the magnetic recording medium may suffer from a high noise. On the contrary, if the specific surface area exceeds 100 m$^2$/g, the desired surface properties can hardly be obtained. The coercive force of the ferromagnetic powder is preferably from 500 Oe to 4,000 Oe, more preferably from 1,200 Oe to 3,000 Oe. If the coercive force of the ferromagnetic powder is less than 500 Oe, the short wavelength output is lowered. On the contrary, if the coercive force of the ferromagnetic powder exceeds 4,000 Oe, recording by the head can hardly be effected. The saturation magnetization σs of the ferromagnetic powder is generally in the range of 50 to 90 emu/g, preferably 60 to 90 emu/g. The tapped density of the ferromagnetic powder is preferably in the range of 0.5 to 1.5 g/ml, more preferably 0.8 to 1.2 g/ml. The preparation of the hexagonal system ferrite can be accomplished by glass crystallization method, coprecipitation method, hydrothermal reaction or the like. However, the present invention is not limited to specific methods.

Examples of the binder resin used in the undercoating layer and the upper magnetic layer of the present invention include known thermoplastic resins, thermosetting resins, reactive resins or mixture thereof. Examples of the thermoplastic resins include those having a glass transition temperature of −100° to 150° C., a number-average molecular weight of 1,000 to 200,000, preferably 10,000 to 100,000, and a polymerization degree of about 50 to 1,000.

Examples of such thermoplastic resins include polymers or copolymers containing as constituent units vinyl chloride, vinyl acetate, vinyl alcohol, maleic acid, acrylic acid, ester acrylate, vinylidene chloride, acrylonitrile, methacrylic acid, ester methacrylate, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate. These resins are further described in "Plastic Handbook", Asakura Shoten, Japan (Apr. 1, 1985). Further, known electron radiation curing resins can be incorporated in either the undercoating layer or upper magnetic layer. Examples of these resins and their preparation methods are further described in JP-A-62-256219.

The above-described resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate. Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane. Of all these binders, those in which at least one polar group selected from —COOM, —SO$_3$M, —OSO$_3$M, —P=O(OM)$_2$, —O—P=(OM)$_2$ (in which M represents a hydrogen atom or alkaline metal salt group), —OH, —NR$^2$, —N$^+$R$^3$ (in which R is a hydrocarbon group), epoxy group, —SH, —CN, sulfobetaine, carboxybetaine and phosphobetaine has been introduced by copolymerization or addition reaction may be optionally used to obtain better dispersibility and durability. The amount of such a polar group is in the range of $10^{-1}$ to $10^{-8}$ mol/g, preferably $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE available from Union Carbide, MPR-TA, MPR-TA5, MPR-TAL, MPR-TSN, MPR-TMF, MPR-TS, MPR-TM and MPR-TAO available from Nisshin Kagaku Kogyo K.K., 1000W, DX80, DX81, DX82, DX83 and 100FD available from The Electro Chemical Industrial Co., Ltd., MR-104, MR-105, MR110, MR100, 400X-110A available from Nihon Zeon, Nippolan N2301, N2302 and N2304 available from Nippon Urethane, T-5105, T-R3080 and T-5201, Barnok D-400 and D-210-80, and Crisbon 6109 and 7209 available from Dainippon Ink And Chemicals, Incorporated, Vylon UR8200, UR8300, UR8600, UR5500, UR4300, RV530, RV280 and FB-84 available from Toyobo Co., Ltd., Difelamine 4020, 5020, 5100, 5300, 9020, 9022 and 7020 available from Dainichi Seika K.K., MX5004 available from Mitsubishi Chemical Industries Ltd., Saprene SP-150, TIM-3003 and TIM-3005 available from Sanyo Kasei K.K., and Salan F310 and F210 available from Asahi Chemical Industry Co., Ltd. Preferred among these compounds are MR-104, MR110, UR8300, UR-8600, UR-5500, UR-4300 and TIM-3005.

The content of the binder to be contained in the magnetic layer of the present invention is normally in the range of 5 to 50% by weight, preferably 10 to 30% by weight based on the weight of ferromagnetic particles. If a vinyl chloride resin is used, its content is preferably in the range of 5 to 30% by weight. If a polyurethane resin is used, its content is preferably in the range of 2 to 20% by weight. If a polyisocyanate is used, its content is preferably in the range of 2 to 20% by weight. These binder resins are preferably used in these amounts in combination. In the present invention, if polyurethane is used, its glass transition temperature, breaking extension, breaking stress and yield point are preferably in the range of −50° to 100° C., 100 to 2,000%, 0.05 to 10 kg/cm$^2$ and 0.05 to 10 kg/cm$^2$, respectively.

The magnetic recording medium of the present invention comprises at least two layers, i.e., the undercoating layer and the upper magnetic layer. Accordingly, the amount of the binder, the amounts of vinyl chloride resin, polyurethane resin, polyisocyanate or other resins contained in the binder, the molecular weight of resins constituting the magnetic layer, the amount of polar group, and the physical properties of the above mentioned resins can be altered from the undercoating layer to the upper magnetic layer or other magnetic layers. The known technique for multi-layer magnetic layer can be employed. For example, if the amount of the binder differs from the upper layer to the lower layer or the interlayer, it is useful to increase the amount of the binder to be contained in the upper magnetic layer in order to reduce the occurrence of scratch on the surface of the magnetic layer. In order to improve the touch of the magnetic recording medium to the head, the amount of the binder to be contained in magnetic layers other than the upper magnetic layer or interlayers may be increased to render the magnetic recording medium flexible.

Examples of the above-mentioned multi-layer constitution are described, e.g., in JP-A-59-167854 and JP-A-4-10216 for the three-layer constitution, and JP-A-63-300425, JP-A-63-261529, JP-A-63-259826, JP-A-63-261530, JP-A-64-13225, JP-A-64-19524, JP-A-64-27022, JP-A-64-79931, JP-A-1-106331, JP-A-1-106332, JP-A-1-199316, JP-A-1-205724, JP-A-1-105725, JP-A-1-105726, JP-A-1-220219 and JP-A-1-224916 for the two-layer constitution.

Examples of polyisocyanates which can be used in the present invention include isocyanates such as tolylenediisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Colonate L, Colonate HL, Colonate 2030, Colonate 2031, Millionate MR and Millionate MTL available from Nihon Polyurethane, Takenate D-102, Takenate D-110N, Takenate D-200 and Takenate D-202 available from Takeda Chemical Industries, Ltd., and Desmodur L, Desmodur IL, Desmodur N and Desmodur HL available from Sumitomo Bayer. These isocyanates may be used singly. Alternatively, by making the best use of the difference in hardening reactivity, two or more of these isocyanates can be used in combination in both the undercoating layer and upper magnetic layer.

Examples of carbon black which can be incorporated in the undercoating layer and the upper magnetic layer of the present invention include furnace black for rubber, thermal black for rubber, black for color, acetylene black, etc. Such carbon black preferably has a specific surface area of 5 to 500 m$^2$/g, DBP oil adsorption of 10 to 400 ml/100 g, average particle diameter of 5 mµ to 300 µm, pH value of 2 to 10, water content of 0.1 to 10%, and tapped density of 0.1 to 1 g/cc. Specific examples of carbon black used in the present invention include BLACKPEARLS 2000, 1300, 1000, 900, 800, 880, 700, VULCAN and XC-72 produced by Cabot, #80, #60, #55, #50, and #35 produced by Asahi Carbon, #2400, #2300, #900, #1000, #30, #40, and #10B produced by Mitsubishi Chemical Industries Ltd., CONDUCTEX SC and RAVEN 150, 50, 40 and 15 produced by Columbia Carbon. These carbon blacks may be surface-treated with a dispersant, grafted with a resin or partially graphtized before use.

The carbon black may be previously dispersed in a binder before being added to the nonmagnetic coating. The carbon black may be used singly or in combination. If carbon black is used, its content is preferably in the range of 0.1 to 30% based on the weight of ferromagnetic powder. Carbon black serves to inhibit the electrification of the magnetic layer, reduce the frictional coefficient, provide light screening effect, enhance the film strength, etc. These functions vary with the kind of carbon black used. Accordingly, these carbon blacks may be different in its kind, content and combination between the upper magnetic layer and the undercoating layer or non-magnetic layer, depending on the previously specified properties such as particle size, oil adsorption, electrical conductivity and pH. For carbon blacks which can be incorporated in the upper magnetic layer of the present invention, reference can be made to "Handbook of Carbon Black", Carbon Black Kyokai, Japan.

Specific examples of abrasives which can be incorporated in the upper magnetic layer and the undercoating layer of the present invention include α-alumina having a percent alpha conversion of 90 to 100%, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. In general, known materials having a Mohs hardness of 6 to 10 can be used singly or in combination. A composite material made of these abrasives (abrasive surface-treated with another abrasive) may be used. These abrasives may contain compounds or elements other than the main component but may exert similar effects so far as the content of the main component is not less than 90 to 100%. The particle size of these abrasives is preferably in the range of 0.01 to 2 µm. If necessary, a plurality of abrasives having different particle sizes may be used in combination or a single abrasive having a wide particle diameter distribution may be used to provide similar effects. The tapped density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 m$^2$/g. The abrasives used in the present invention may be in the form of needle, sphere and cube. The abrasives used in the present invention may preferably have edges partially on the surface thereof to provide a high abrasion. Specific examples of abrasives used in the present invention include AKP-20, AKP-30, AKP-50, HIT-50, HIT-60, HIT-60A, HIT-80, HIT-80G, and HIT-100 available from Sumitomo Chemical Co., Ltd., G5, G7, and S-1 available from The Nippon Chemical Industrial Co., Ltd., and TF-100, and TF-140 available from Toda Kogyo K.K. The abrasives used in the present invention can be varied in the kind, content and combination between the subbing layer and the upper layer depending on the purpose. These abrasives may be incorporated in the magnetic coating in the form of dispersion in a binder. The amount of the abrasive present on the surface and edge of the magnetic layer in the magnetic recording medium of the present invention is preferably in the range of 5 to 130 particles/100 µm$^2$, particularly 5 to 90 particles/µm$^2$.

Examples of the additives which can be used in the undercoating layer and the upper magnetic layer of the present invention include those having a lubricating effect, an antistatic effect, a dispersing effect, a plasticizing effect, etc. Specific examples thereof include molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, ester alkylsulfate and alkaline metal salt thereof, polyphenyl ether, fluorine-containing ester alkylsulfate and alkaline metal salt thereof, monoaliphatic ester, dialiphatic ester or trialiphatic ester of $C_{10-24}$ monobasic aliphatic acid (which may contain an unsaturated bond or may be branched) and salt thereof with metals (e.g., Li, Na, K, Cu), $C_{12-22}$ monovalent, divalent, trivalent, tetravalent, pentavalent and hexavalent alcohol (which may contain an unsaturated bond or may be branched), $C_{12-22}$ alkoxy alcohol or $C_{10-24}$ monobasic aliphatic acid (which may contain an unsaturated bond or may be branched) with one of $C_{2-12}$ monovalent, divalent, trivalent, tetravalent, pentavalent and hexavalent alcohols (which may contain an unsaturated bond or may be branched), aliphatic ester of monoalkyl ether of alkylene oxide polymer, $C_{8-22}$ aliphatic amide, $C_{8-22}$ aliphatic amine, etc.

Further specific examples of such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, non-ionic surface active agents such as alkylene oxide, glycerin, glycidol and alkylphenolethylene oxide addition product, cationic surface active agents such as cyclic amine, ester amide, quaternary ammonium salt, hydantoin derivative, heterocyclic compound, phosphonium and sulfonium, anionic surface active agents containing polar groups such as carboxylic acid, sulfonic acid, phosphoric acid, ester sulfate and ester phosphate, amphoteric surface active agents such as amino acid, aminosulfonic acid, sulfuric or phosphoric ester of amino alcohol and alkylbetaine, etc. can be used. These surface active agents are further described in "Kaimen Kasseizai Binran (Handbook of Surface Active Agents)", Sangyo Tosho K.K., Japan. These lubricants, antistatic agents, etc. may not be necessarily 100% pure but may contain impurities such as isomer, unreacted material, by-product, decomposition product and oxide. The content of these impurities is preferably in the range of 30% or less, more preferably 10% or less.

These lubricants and surface active agents used in the present invention may be varied in their kind and content between the undercoating layer and the magnetic layer as necessary. For example, aliphatic acids may be varied in its melting point between the undercoating layer and the magnetic layer to control the oozing thereof to the surface. Esters may be varied in its boiling point or polarity between the undercoating layer and the magnetic layer to control the oozing thereof to the surface. The content of surface active agents may be controlled to improve the coating stability. The content of a surface active agent in the undercoating layer may be higher than that in the magnetic layer to improve the lubricating effect. The present invention is not limited to these examples.

The additives used in the present invention may be entirely or partially added to the system at any steps during the preparation of the coating compositions for the magnetic layer and the undercoating layer. For example, these additives may be mixed with magnetic materials before kneading. Further, these additives may be added to the system at the step of kneading magnetic materials with a binder and a solvent. Alternatively, these additives may be added to the system during or after the dispersion step or shortly before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose.

Examples of the trade name of these lubricants used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor hardened aliphatic acid, NAA-42, NAA-44, Cation SA, Cation MA, Cation AB, Cation BB, Nymean L-201, Nymean L-202, Nymean S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid available from Nippon Oils And Fats Co., Ltd., oleic acid available from Kanto Kagaku K.K., FAL-205 and FAL-123 available from Takemoto Yushi K.K., Enujelb LO, Enujelb IPM and Sansosizer E4030 available from Shinnihon Rika K.K., TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 available from The Shin-etsu Chemical Industry Co., Ltd., Armide P, Armide C, and Armoslip CP available from Lion Armor, Duomine TDO available from The Lion Fat and Oil Co., Ltd., BA-41G available from The Nisshin Oil Mills, Ltd., and Profan 2012E, New Pole PE61, Ionet MS-400, Ionet MO-200, Ionet DL-200, Ionet DS-300, Ionet DS-1000, and Ionet DO-200 available from Sanyo Kasei K.K.

Examples of organic solvents which can be used in preparation of the coating compositions for the magnetic layer and the undercoating layer of the present invention include ketones such as acetone, methyl ethyl ketone, methyl isobutyl ketone, diisobutyl ketone, cyclohexanone, isophorone and tetrahydrofuran, alcohols such as methanol, ethanol, propanol, butanol, isobutyl alcohol, isopropyl alcohol and methyl cyclohexanol, esters such as methyl acetate, butyl acetate, isobutyl acetate, isopropyl acetate, ethyl butyrate and glycol acetate, glycol ethers such as glycol dimethyl ether, glycol monoethyl ether and dioxane, aromatic hydrocarbons such as benzene, toluene, xylene, cresol and chlorobenzene, chlorinated hydrocarbons such as methylene chloride, ethylene chloride, carbon tetrachloride, chloroform, ethylene chlorohydrin and dichlorobenzene, N,N-dimethylformamide, and hexane. These organic solvents may be used in any proportions. These organic solvents are not necessarily 100% pure and may contain impurities such as isomers, unreacted matters, side reaction products, decomposition products, oxides and water content besides main components. The content of these impurities is preferably in the range of 0 to 30%, more preferably 0 to 10%. The kind of organic solvents used in the present invention may be the same from the magnetic layer to the undercoating layer. A solvent having a high surface tension (e.g., cyclohexanone, dioxane) may be used for the undercoating layer to enhance the coating stability. Specifically, it is desirable that the arithmetic mean of the solvent composition for the upper magnetic layer is not smaller than that of the solvent composition for the undercoating layer. In order to enhance the dispersibility, the polarity of the organic solvent is preferably high. The solvents used for these layers preferably contain a solvent having a dielectric constant of 15 to 25 in an amount of 50 to 80%. The solubility parameter of these solvents is preferably in the range of 8 to 11.

In the thickness configuration of the magnetic recording medium of the present invention, the thickness of the non-magnetic support is generally in the range of 1 to 9 μm. In particular, a non-magnetic support having a thickness of as small as 1 to 8 μm is preferred. The total thickness of the upper magnetic layer and the undercoating layer is generally in the range of 1/100 to 2 times the thickness of the non-magnetic support. An adhesive layer may be provided between the non-magnetic support and the undercoating layer to enhance the adhesion therebetween. The thickness of the adhesive layer is generally in the range of 0.01 to 0.5 μm, preferably 0.02 to 0.3 μm. A back coat layer may be provided on the other side of the non-magnetic support. The thickness of the back coat layer is in the range of 0.1 to 2 μm, preferably 0.3 to 1.0 μm. The adhesive layer and the back coat layer may comprise known materials. The thickness of these adhesive and back coat layers is included in the thickness of the magnetic recording medium of the present invention.

The back coat layer may be a coated layer comprising non-magnetic powder and a binder resin. The non-magnetic powder used in the back coat layer is not particularly limited and may be various inorganic powder, polymer powder and the like. Examples thereof include calcium carbonate, iron oxide, aluminum oxide, barium sulfate, titanium oxide, chromium oxide, silicon oxide, etc. Carbon black and graphite can also be incorporated in the back coat layer to achieve electric conductivity of the back coat layer and improve the running property of the magnetic recording medium. As the binder resin for the back coat layer, those used in the magnetic layers and the undercoating layer can be used. Examples thereof include vinyl chloride resins, cellulose resins such as nitrocellulose, polyurethane resins, phenoxy resins, and epoxy resins. The dispersibility of the non-magnetic powder can be improved by incorporating various polar groups into these binder resins. The back coat layer may further contain a lubricant to further improve the lubrication of the magnetic layer by transferring the lubricant from the back coat layer to the magnetic layer. Furthermore, various materials described in JP-A-5-68007, JP-A-57-53825, and JP-A-59-28240 can also be used for the back coat layer in the present invention.

The non-magnetic support used in the present invention has a micro vickers hardness of 75 to 100 kg/mm². Examples of the non-magnetic support include any known film such as biaxially-oriented polyethylene naphthalate, polyamide, polyimide, aromatic polyamide and polybenzoxidazole. In particular, a non-magnetic support comprising an alamide resin is preferred. In order to adjust the micro vickers hardness of the non-magnetic support to 75 to 100 kg/mm², the heating, relaxation and orientation conditions during the film-making process and the materials used may be properly selected. The support may be previously subjected to corona discharge, plasma treatment, easy adhesion treatment, heat treatment, dust-resistant finish, etc. The nonmagnetic support preferably has a center line average surface roughness of 0.001 to 0.03 μm, preferably 0.001 to 0.02 μm, more preferably 0.001 to 0.01 μm. The nonmagnetic support preferably not only has a small center line average surface roughness but also has no large protrusions having a size of 1 μm or more. The shape of the surface roughness may be freely controlled by the size and amount of filler incorporated in the support as necessary. Examples of the filler include oxide and carbonate of Al, Ca, Si, and Ti, regardless of whether it is crystalline or amorphous, and finely divided powder of organic material such as acryl and melamine resins.

The non-magnetic support used in the present invention preferably exhibits F-5 values of 10 to 50 kg/mm² in the running direction of the tape and 10 to 30 kg/mm² in the width direction of the tape. In general, F-5 value in the running direction is higher than F-5 value in the width direction. However, if the crosswise strength of the non-magnetic support needs to be high, this specification may be changed. The non-magnetic support preferably exhibits a lengthwise and crosswise heat shrinkage of 0 to 3%, more preferably 0 to 1.5% at 100° C. for 30 minutes, and 0 to 1%, more preferably 0 to 0.5% at 80° C. for 30 minutes. The breaking strength of the support is preferably in the range of 5 to 100 kg/mm² in both directions. The elastic modulus of the support is preferably in the range of 100 to 2,000 kg/mm² in both directions.

The process for the preparation of the magnetic coating composition for the magnetic layer in the magnetic recording medium of the present invention comprises at least kneading step, dispersion step, and mixing step which is optionally provided before or after these steps. These steps each may consist of two or more stages. The raw materials used in the present invention, e.g., magnetic particles, binder resins, nonmagnetic particles, carbon black, abrasive, antistatic agent, lubricant and solvent, may be added to the system at the beginning or during any step. These raw materials each may be batchwise added to the system at two or more steps. For example, polyurethane may be batchwise charged in the system at the kneading step, dispersion step or a mixing step for the viscosity adjustment after dispersion. In order to accomplish the objects of the present invention, while a known preparation technique can, of course, be used as a step, in the kneading step, an apparatus having a strong kneading power such as continuous kneader and pressure kneader can be used to enhance the residual magnetic flux density Br of the magnetic recording medium of the present invention. If a continuous kneader or pressure kneader is used, the magnetic powders are kneaded with the whole or part (preferably 30% by weight or more of the total weight of all binder resins) of the binder in an amount of 15 to 500 parts by weight based on 100 parts by weight of magnetic powders. These kneading techniques are further described in JP-A-1-106388 and JP-A-64-79274. In the preparation of the coating composition of the nonmagnetic subbing layer, a dispersion medium having a high specific gravity is preferably used, and zirconia beads and metal beads are suitable therefor.

As examples of the apparatus and methods for the coating of a magnetic recording medium having a multi-layer structure according to the present invention, the following wet-on-wet coating methods can be used:

1. Gravure coating method, roll coating method, blade coating method, extrusion coating method or the like, which is generally used in the application of a magnetic coating, is employed to provide an undercoating layer. An upper magnetic layer is then applied to the undercoating layer by means of a support pressure type extrusion coating apparatus as disclosed in JP-B-1-46186, JP-B-60-238179, and JP-B-2-265672 while the undercoating layer is wet.

2. An upper layer and a lower layer are applied almost simultaneously by means of a coating head having two coating slits as disclosed in JP-A-63-88080, JP-A-2-17921, and JP-A-2-265672.

3. An upper layer and a lower layer are applied almost simultaneously by means of an extrusion coating apparatus with a backup roll as disclosed in JP-A-2-174965.

In order to inhibit the agglomeration of ferromagnetic powder that deteriorates the electro-magnetic conversion characteristics of the magnetic recording medium, a method as disclosed in JP-A-62-95174 and JP-A-1-236968 can be used to provide the coating composition inside the coating head with a shearing force. For the viscosity of the coating composition, the range disclosed in JP-A-3-8471 should preferably be satisfied.

In order to obtain a magnetic recording medium according to the present invention, a strong orientation is generally effected. A solenoid having 1,000 G or more and a cobalt magnet having 2,000 G or more are preferably used in combination. Further, a proper drying process is preferably provided before the orientation step to maximize the orientation after drying. If the present invention is applied to disc medium, an orientation method for randomizing orientation is preferred. The orientation for changing the direction of orientation between the second magnetic layer and the first magnetic layer does not necessarily need to be in the coating direction in the plane but may be in the perpendicular or crosswise direction.

Examples of the calendering roll for calendering treatment include a roll made of heat-resistant plastics such as epoxy, polyimide, polyamide and polyimide. A combination of metallic rolls may be used. The processing temperature of the calendering treatment is preferably in the range of 70° to 150° C., more preferably 80° to 150° C. The linear pressure is preferably in the range of 200 to 500 kg/cm, more preferably 300 to 400 kg/cm.

The magnetic recording medium of the present invention preferably exhibits a frictional coefficient of 0.1 to 0.5, more preferably 0.15 to 0.3, with respect to SUS420J on the magnetic layer side and the opposite side. The magnetic layer preferably has a specific surface resistivity of $10^4$ to $10^{11}$ Ω/sq. The magnetic layer preferably exhibits an elasticity of 100 to 2,000 kg/mm$^2$ at 0.5% elongation in both the running direction and crosswise direction. The breaking strength of the magnetic layer is preferably in the range of 1 to 30 kg/cm$^2$. The elasticity of the magnetic recording medium is preferably in the range of 100 to 1,500 kg/mm$^2$ in both the running direction and crosswise direction. The residual elongation of the magnetic recording medium is preferably in the range of 0 to 0.5%. The heat shrinkage of the magnetic recording medium at all temperatures lower than 100° C. is preferably 0 to 1%, more preferably 0 to 0.5%, particularly 0 to 0.1%. The glass transition temperature (the maximum of loss modulus of dynamic viscoelasticity measured at 110 Hz) of the magnetic layer is preferably from 50° to 120° C. The glass transition temperature of the undercoating layer is preferably from 0° to 100° C. The loss modulus of the magnetic layer is preferably in the range of $1 \times 10^8$ to $8 \times 10^9$ dyne/cm$^2$. The loss tangent of the magnetic layer is preferably in the range of not more than 0.2. If the loss tangent of the magnetic layer is too large, it can easily suffer from faulty due to adhesion. The amount of the residual solvent contained in the magnetic layer is preferably in the range of 0 to 100 mg/m$^2$, more preferably 0 to 10 mg/m$^2$. The amount of the residual solvent contained in the upper magnetic layer is preferably less than that of the undercoating layer. The non-magnetic undercoating layer and the magnetic layer each preferably has a porosity of 0 to 30 vol %, more preferably 0 to 20 vol %. While the porosity is preferably small to provide a high output, in some cases, certain porosity is preferably secured depending on the purpose. For example, in the case of magnetic recording media for data recording, repeated use of which is particularly needed, the porosities are preferably large to provide excellent running durability.

In the magnetic characteristics of the magnetic recording medium of the present invention measured under a magnetic field of 5 KOe, the squareness ratio is preferably in the range of 0.70 to 1.00, more preferably 0.80 to 1.00, further preferably 0.90 to 1.00, in the tape running direction. The squareness ratio in two directions perpendicular to the tape running direction is preferably in the range of 80% or less of that in the tape running direction. SFD of the magnetic layer is preferably in the range of 0.1 to 0.6.

The center line surface roughness Ra of the magnetic layer is preferably in the range of 1 nm to 10 nm but should be properly adjusted depending on the purpose. The smaller Ra is, the better are the electromagnetic characteristics. On the contrary, the larger Ra is, the better is the running durability. The RMS surface roughness ($R_{RMS}$) of the magnetic layer determined by AFM (atomic force microscopy) evaluation is preferably in the range of 2 nm to 15 nm.

The magnetic recording medium of the present invention comprises an undercoating layer and an upper magnetic layer. The physical properties may appropriately be altered between the undercoating layer and the magnetic layer depending on the purpose. For example, the elasticity of the magnetic layer can be enhanced to improve the running durability thereof while the elasticity of the undercoating layer can be lower than that of the magnetic layer to improve the contact of the magnetic recording medium with the head.

The present invention will be further described in the following examples and comparative examples, but the present invention should not be construed as being limited thereto. The term "parts" as used herein is meant to indicate "parts by weight".

EXAMPLES 1 TO 5 AND COMPARATIVE EXAMPLES 1 TO 8

1. Non-magnetic Support

Four non-magnetic supports, i.e., polyalamide, two kinds of polyethylene naphthalate, and polyethylene terephthalate, were prepared.

A: Polyalamide 150 l of dried N-methylpyrrolidone was charged into a 300-l agitation tank. 7 kg of lithium chloride, 2.4 kg of 2-chloro-p-phenylenediamine and 0.50 kg of 4,4'-diaminodiphenyl ether were then dissolved in N-methylpyrrolidone. The solution was entirely and slowly stirred while being kept at a temperature of 0° C. During this process, 4.1 kg of granulated terephthalic chloride was added to the solution in about 40 minutes. The mixture was further stirred for 1 hour to obtain a viscous polymer solution. The polymer solution was then added to a large amount of water in a large size mixer so that it was reprecipitated to obtain a fibrous solid polymer. The fibrous solid polymer was washed, and then dried. 2.5 kg of the polymer, 1.2 kg of lithium bromide and 60 l of N-methylpyrrolidone were then mixed to obtain a uniform solution at room temperature. The polymer exhibited an intrinsic viscosity of 5.1. The solution was uniformly casted over a surface-polished stainless steel drum through a spinneret, and then heated in an atmosphere of 125° C. for about 30 minutes. The resulting film was peeled off the drum, and then continuously dipped in a water bath for about 10 minutes. The film was then heated at a temperature of 320° C. while being fixed to a predetermined length by a tenter for about 5 minutes to obtain a transparent smooth film having a thickness of 4.5 μm. The film thus obtained exhibited a strength of 42 kg/mm$^2$, a tensile modulus of 1,500 kg/mm$^2$ and a percent heat shrinkage of 0.5% at 250° C. The film also exhibited a micro vickers hardness of 93.7 kg/mm$^2$.

B: Polyethylene Naphthalate 100 parts of dimethyl naphthalene-2,6-dicarboxylate, 60 parts of ethylene glycol, 0.086 parts of magnesium acetate and 0.03 parts of antimony trioxide were charged into a reaction vessel to effect ester exchange reaction. The reaction temperature was changed from 160° to 220° C. with the progress of reaction. The completion of the reaction was confirmed by the output amount of methanol. After the completion of ester exchange reaction, 0.25 parts of an ethylene glycol slurry of colloidal silica having an average particle diameter of 0.1 μm as silicon oxide and 0.006 parts of an ethylene glycol solution of trimethyl phosphate as a phosphorus atom source were then added to the reaction solution. The reaction solution was then allowed to undergo polycondensation at a final temperature of 285° C. and a final pressure of 0.09 mmHg by an ordinary method to obtain a polyethylene naphthalate having an intrinsic viscosity of 0.59. The polyethylene naphthalate polymer chips thus obtained were dried, and then melt-extruded at a temperature of 298° C. to prepare an unstretched film. The unstretched film thus prepared was stretched by a factor of 5.5 in the longitudinal direction and by a factor of 3.2 in the crosswise direction, and then thermally fixed at a temperature of 200° C. for 30 seconds to obtain a biaxially-stretched polyethylene naphthalate film having a thickness of 4.5 μm. The film thus obtained exhibited a micro vickers hardness of 86 kg/mm².

C: Polyethylene Naphthalate

The same unstretched film as used in the preparation of the above non-magnetic support B was stretched by a factor of 7.0 in the longitudinal direction and by a factor of 2.5 in the crosswise direction, and then thermally fixed at a temperature of 200° C. for 30 seconds to obtain a biaxially-stretched polyethylene naphthalate film having a thickness of 4.5 μm. The film thus obtained exhibited a micro vickers hardness of 71.3 kg/mm².

D: Polyethylene Terephthalate

To a mixture of equimolecular amounts of dimethyl terephthalate and ethylene glycol were then added 0.08% by weight of calcium acetate, 0.15% by weight of lithium acetate, 0.04% by weight of antimony acetate, 0.15% by weight of trimethyl phosphate and 0.03% by weight of calcium carbonate having an average particle diameter of 1.1 μm. The reaction mixture was then allowed to undergo polycondensation by an ordinary method to prepare a polyester. The polyester thus obtained was dried, and then extruded through an extrusion molding machine to prepare an unstretched sheet. The sheet was then stretched by a factor of 3.2 in the longitudinal (extrusion) direction at a film temperature of 100° C. by rolls. The sheet was then stretched by a factor of 3.7 in the crosswise direction at a film temperature of 110° C. while being fixed by a tenter at both the ends thereof. Subsequently, the sheet was relaxed by 5% in the crosswise direction, and then subjected to heat treatment at a temperature of 205° C. for 10 seconds to obtain a polyethylene terephthalate film having a thickness of 4.5 μm. The film thus obtained exhibited a micro vickers hardness of 70 kg/mm².

2. Adhesive Layer

An adhesive layer having the following composition was provided.

| | |
|---|---|
| Polyester resin (STAFIX available from Fuji Photo Film Co., Ltd.) | 10 parts |
| Methyl ethyl ketone | 200 parts |
| Toluene | 200 parts |

The foregoing binder solution was applied to the support to a dry thickness of not more than 0.1 μm prior to the application of the undercoating layer.

3. Undercoating Layer

3-A: Non-magnetic Undercoating Layer

| | |
|---|---|
| Non-magnetic powder TiO₂ (crystalline rutile) | 80 parts |
| Average primary particle diameter: 0.035 μm<br>Specific surface area determined by BET method: 40 m²/g<br>pH: 7<br>TiO₂ content: not less than 90%<br>DBP oil absorption: 27 to 38 g/100 g<br>Surface treatment: Al₂O₃ | |
| Carbon black | 20 parts |
| Average primary particle diameter: 16 mμ<br>DBP oil absorption: 80 ml/100 g<br>pH: 8.0<br>Specific surface area determined by BET method: 250 m²/g<br>Volatile content: 1.5% | |
| Vinyl chloride-vinyl acetate-vinyl alcohol copolymer | 12 parts |
| —N(CH₃)₃⁺Cl⁻ content as a polar group: 5 × 10⁻⁶ eq/g<br>Composition ratio: 86/13/1<br>Polymerization degree: 400 | |
| Polyester polyurethane resin | 5 parts |
| Neopentyl glycol/caprolactone polyol/MDI: 0.9/2.6/1<br>—SO₃Na group content: 1 × 10⁻⁴ eq/g | |
| α-Al₂O₃ (average particle diameter: 0.2 μm) | 10 parts |
| Butyl stearate | 1 part |
| Stearic acid | 1 part |
| Methyl ethyl ketone | 100 parts |
| Cyclohexanone | 50 parts |
| Toluene | 50 parts |

3-B: Magnetic Undercoating Layer

| | |
|---|---|
| Ferromagnetic powder: cobalt-containing iron oxide magnetic powder | 100 parts |
| Hc: 8,400 Oe<br>SBET: 45 m²/g<br>Crystalline size: 250Å<br>Acicular ratio: 1/7 | |
| Carbon black | 15 parts |
| Average primary particle diameter: 16 mμ<br>DBP oil absorption: 80 ml/100 g<br>pH: 8.0<br>Specific surface area determined by BET method: 250 m²/g<br>Volatile content: 1.5% | |
| Vinyl chloride-vinyl acetate-vinyl alcohol copolymer | 11 parts |
| —N(CH₃)₃⁺Cl⁻ content as a polar group: 5 × 10⁻⁶ eq/g<br>Composition ratio: 86/13/1<br>Polymerization degree: 400 | |
| Polyester polyurethane resin | 8 parts |
| Neopentyl glycol/caprolactone polyol/MDI: 0.9/2.6/1<br>—SO₃Na group content: 1 × 10⁻⁴ eq/g | |
| α-Al₂O₃ (average particle diameter: 0.2 μm) | 10 parts |
| Butyl stearate | 1 part |
| Stearic acid | 1 part |

| | |
|---|---|
| Methyl ethyl ketone | 100 parts |
| Cyclohexanone | 50 parts |
| Toluene | 50 parts |

3-C: Non-magnetic Undercoating Layer

An undercoating layer composition was prepared in the same manner as in 3-A except that the amount of the carbon black was reduced from 20 parts to 3 parts while the amount of $\alpha$-$Al_2O_3$ was increased from 10 parts to 25 parts.

3-D: Magnetic Undercoating Layer

An undercoating layer composition was prepared in the same manner as in 3-B except that the amount of the carbon black was reduced from 15 parts to 1 part while the amount of $\alpha$-$Al_2O_3$ was increased from 10 parts to 20 parts.

4. Upper Magnetic Layer

| 4-A: Metallic Magnetic Layer | |
|---|---|
| Fine powder of ferromagnetic metal (composition: Fe/Co = 90/10) | 100 parts |
| Hc: 1,960 Oe Specific surface area determined by BET method: 59 m²/g Crystalline size: 150Å Surface treatment: $Al_2O_3$, $SiO_2$ Average particle diameter (major axis): 0.12 μm Acicular ratio: 8 σs: 130 emu/g | |
| Vinyl chloride copolymer | 12 parts |
| "MR110" (available from Nippon Zeon Co., Ltd.; polymerization degree: 300) | |
| Polyester polyurethane resin | 3 parts |
| Neopentyl glycol/caprolactone polyol/MDI: 0.9/2.6/1 —$SO_3Na$ group content: $1 \times 10^{-4}$ eq/g | |
| $\alpha$-$Al_2O_3$ (average particle diameter: 0.15 μm) | 10 parts |
| Carbon black (average particle diameter: 0.10 μm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |
| 4-B: Barium Ferrite Magnetic Layer | |
| Hexagonal system barium ferrite | 100 parts |
| Hc: 1,500 Oe Specific surface area determined by BET method: 40 m²/g Average particle diameter (tablet diameter): 0.05 μm σs: 60 emu/g Surface treatment $Al_2O_3$: 5% by weight $SiO_2$: 2% by weight | |
| Vinyl chloride copolymer | 12 parts |
| —$PO_3Na$ content: $1 \times 10^{-4}$ eq/g Polymerization degree: 300 | |
| Polyester polyurethane resin | 3 parts |
| Neopentyl glycol/caprolactone polyol/MDI: 0.9/2.6/1 —$SO_3Na$ group content: $1 \times 10^{-4}$ eq/g | |
| $\alpha$-Alumina (average particle diameter: 0.3 μm) | 2 parts |
| Carbon black (average particle diameter: 0.015 μm) | 0.5 parts |
| Butyl stearate | 1 part |
| Stearic acid | 2 parts |
| Methyl ethyl ketone | 125 parts |
| Cyclohexanone | 125 parts |

In order to prepare the foregoing coating compositions, the components were kneaded by a continuous kneader, and then subjected to dispersion by a sand mill. The dispersions thus obtained were treated as follows. In some detail, 1 part of a polyisocyanate was added to the coating composition of undercoating layer. 3 parts of a polyisocyanate was added to the coating composition of upper magnetic layer. 40 parts of a mixture of methyl ethyl ketone and cyclohexanone were added to the coating composition of undercoating layer and the coating composition of upper magnetic layer, respectively. The two mixtures were each filtered through a filter having an average pore diameter of 1 μm to prepare the desired coating composition of undercoating layer and coating composition of magnetic layer, respectively.

The coating composition of undercoating layer was applied to the foregoing non-magnetic support having a thickness of 4.5 μm and a center line surface roughness of 0.005 μm to a dry thickness of 2 μm. The coating composition of the magnetic layer was immediately applied to the undercoating layer to a dry thickness of 0.2 μm. The coated material was then oriented by a cobalt magnet having a magnetic force of 3,000 G and a solenoid having a magnetic force of 1,500 G while the two layers were wet. The coated material thus oriented was then dried. The coated material was then treated at a temperature of 85° C. by a 7-step calender singly composed of metal roll at a rate of 200 m/min. Thereafter, a back layer was applied to the coated material to a thickness of 0.5 μm. The coated material was then slitted into 8-mm wide web to prepare a 8-mm video tape.

Evaluation Method (Micro vickers hardness)

The micro vickers hardness of a specimen was determined by means of a thin film hardness tester HMA-400 available from NEC Corp. The tip of the penetrator used was a triangular pyramid made of diamond with a tip sharpness of 80° and a tip radius of 0.1 μm. The measurement was effected at a maximum load of 0.2 g, an indentation rate of 1.4 nm/sec and an indentation depth of 0.1 to 1.0 μm. The force received by the penetrator as it penetrates into the specimen was measured. The load received by the penetrator was plotted against the square of the depth of indentation by the penetrator. An inflection point appeared at the interface of the upper magnetic layer and the undercoating layer which differ from each other in hardness. The slope of the curve changed from one side of the inflection point to the other. The micro vickers hardness can be determined from this slope. The definition is as follows. The micro hardness HM and the micro vickers hardness HV can be given by the following equations:

$$HV = 54 \times (HM:)^{0.8}$$

$$HM = W/3.29\delta^2$$

where W is load; and δ is indentation depth. For details, reference can be made to "Hakumaku no rikigakuteki tokusei hyouka gijutu (Technique of evaluation of dynamic characteristics of thin film)", Realize Corp.

(Vickers hardness of undercoating layer)

It is a common practice to lap the tape by a rotary grinding apparatus such as diamond wheel at a rotary speed of 100 to 10,000 rpm and a tension of 10 to 2,000 g/12.65 mm. The grinding apparatus may be properly selected from the group consisting of abrasive tape, Arkansas grinding wheel, etc. It is necessary that a specimen cut from the ground area of the upper magnetic layer be successively measured for magnetization by VSM until the elimination of magnetization is confirmed. Then, the vickers hardness of the material can be effected.

(Thickness of magnetic layer)

The magnetic recording medium was cut in the longitudinal direction by a diamond cutter to a specimen having a width of about 0.1 μm. The section of the specimen was then observed and photographed under a transmission electron microscope at 30,000 power. The print size of the photograph was A4. Thereafter, paying attention to the difference in the shape of ferromagnetic powder and non-magnetic powder between the magnetic layer and the non-magnetic layer, the interface of the two layers was marked black on the photograph. Similarly, the surface of the magnetic layer was marked black on the photograph. The distance between the two black marking lines was then measured by an image processor IBAS2 available from Zeiss Corp. The measurement was effected at various points along a length of 21 cm on the photograph. These measurements were then arithmetically averaged to calculate the thickness of the magnetic layer.

(Adhesive strength)

The 8-mm wide tape specimen was put on an adhesive tape available from 3M Corp. The specimen was then peeled off the adhesive tape at an angle of 180° at a temperature of 23° C. and 70% RH to determine the peel strength thereof. The practically allowable minimum adhesive strength is 20 g, preferably 50 g.

(Specific surface area by BET method)

Quantasorb (available from US Quantachrome) was used. The specimen was dehydrated at a temperature of 250° C. in an atmosphere of nitrogen for 30 minutes, and then measured for specific surface area by BET single-point method (partial pressure: 0.30).

(Magnetic properties Hc; residual magnetic flux density Br; and squareness ratio)

These properties were measured at Hm of 10 kOe by means of an oscillating specimen type magnetic flux meter (available from Toei Kogyo K.K., Japan).

(Center line average surface roughness Ra)

The surface of the magnetic recording medium was measured for Ra on the area of about 250 nm×250 nm by MIRAU method using TOPO3D available from WYKO Corp. The measurement wavelength was about 650 nm. Spherical surface correction and cylinder correction were made on the measurements. In this measurement method, a non-contact surface roughness meter utilizing interference of light was used.

(STMrms average surface roughness)

The measurement of STM was carried out by means of Nanoscopell available from Digital Instrument Corp. The area of 6 μm×6 μm was scanned at a tunnel current of 10 nA and a bias voltage of 400 mV. For the surface roughness, Rrms on this area was determined according to the following formula and compared with each other.

$$R_{rms} = \left( \frac{1}{l} \int_0^l y^2 dx \right)^{1/2}$$

wherein l represents the measured length.

(Average particle diameter of ferromagnetic powder and non-magnetic powder)

The specimen was photographed under a transmission electron microscope. The major axis diameter and minor axis diameter of the powder were directly measured on the photograph. Alternatively, the photograph was traced by an image analyzer IBASS1 available from Carlzeis Corp. to determine the major axis diameter and minor axis diameter of the powder. The two methods were properly used in combination to determine the average particle diameter.

(Crystalline size of ferromagnetic powder)

In the case of ferromagnetic γ-iron oxide powder, the crystalline size of the specimen was determined from the difference in the half value width of diffraction line of (4,4,0) plane and (2,2,0) plane by X-ray diffractometry. In the case of ferromagnetic metal powder, the crystalline size of the specimen was determined from the difference in the half value width of diffraction line of (1,1,0) plane and (2,2,0) plane by X-ray diffractometry.

(Electromagnetic characteristics) 7 MHz output:

A 7 MHz signal was recorded on the magnetic recording medium using a 8-mm video deck "FUJIX8" available from Fuji Photo Film Co., Ltd. The 7 MHz signal output reproduced from the magnetic recording medium was measured by an oscilloscope with a 8-mm video tape SAG P6-120 (available from Fuji Photo Film Co., Ltd.) as a reference. C/N ratio:

A 7 MHz signal was recorded on the magnetic recording medium using a 8-mm video deck "FUJIX8" available from Fuji Photo Film Co., Ltd. 6 MHz noises generated when the recorded signal was reproduced were measured by a spectrum analyzer. The ratio of the reproduced signal to noise was determined.

(Running durability)

The specimen was allowed to run 100 times through a 8-mm video deck FUJIX8 (available from Fuji Photo Film Co., Ltd.) at a temperature of 23° C. and 70%RH. Ten video decks were used for ten specimens, respectively. During this running test, the output drop was measured. After the running test, contamination on various parts in the deck and the edge damage were evaluated.

A: The output drop is less than 3 dB, and no contamination is visually observed on various parts in the deck.

B: The output drop is less than 3 dB, but much contamination is visually observed on various parts in the deck.

C: The output drop is greater than 3 dB, and much contamination is visually observed on various parts in the deck.

The results are set forth in Table 1.

TABLE 1

|  | Example 1 | Example 2 | Comparative Example 1 | Comparative Example 2 |
| --- | --- | --- | --- | --- |
| Non-magnetic support | A | B | C | D |
| Thickness (μm) | 4.5 | 4.5 | 4.5 | 4.5 |
| Micro vickers hadrness (kg/mm²) | 93.7 | 86 | 71.3 | 70 |
| Undercoating layer | 3-A | 3-A | 3-A | 3-A |

TABLE 1-continued

|  |  |  |  |  |
|---|---|---|---|---|
| Thickness (μm) | 2.0 | 2.0 | 2.0 | 2.0 |
| Micro vickers hardness (kg/mm²) | 48 | 48 | 48 | 48 |
| Upper magnetic layer | 4-A | 4-A | 4-A | 4-A |
| Thickness (μm) | 0.2 | 0.2 | 0.2 | 0.2 |
| Yield (%) | 100 | 99 | 99 | 97 |
| Adhesive strength (g) | 55 | 78 | 80 | 85 |
| Electomagnetic characteristics |  |  |  |  |
| 7 MHz output (dB) | 8.2 | 8.1 | 3.2 | 2.1 |
| C/N ratio (dB) | 5.5 | 5.6 | 4.0 | 3.1 |
| Running durability | A | A | B | C |

|  | Comparative Example 3 | Example 3 | Example 4 | Comparative Example 4 |
|---|---|---|---|---|
| Non-magnetic support | A | A | B | D |
| Thickness (μm) | 4.5 | 4.5 | 4.5 | 4.5 |
| Micro vickers hardness (kg/mm²) | 93.7 | 93.7 | 86 | 70 |
| Undercoating layer | 3-C | 3-B | 3-B | 3-B |
| Thickness (μm) | 2.0 | 2.0 | 2.0 | 2.0 |
| Micro vickers hadrness (kg/mm²) | 56 | 42 | 42 | 42 |
| Upper magnetic layer | 4-A | 4-A | 4-A | 4-A |
| Thickness (μm) | 0.2 | 0.2 | 0.2 | 0.2 |
| Yield (%) | 100 | 99 | 99 | 98 |
| Adhesive strength (g) | 10 | 81 | 76 | 61 |
| Electomagnetic characteristics |  |  |  |  |
| 7 MHz output (dB) | 8.2 | 7.5 | 7.6 | 2.5 |
| C/N ratio (dB) | 5.5 | 6.1 | 5.8 | 2.2 |
| Running durability | C | A | A | C |

|  | Comparative Example 5 | Comparative Example 6 | Comparative Example 7 | Example 5 |
|---|---|---|---|---|
| Non-magnetic support | A | A | A | A |
| Thickness (μm) | 4.5 | 4.5 | 4.5 | 4.5 |
| Micro vickers hardness (kg/mm²) | 93.7 | 93.7 | 93.7 | 93.7 |
| Undercoating layer | none | none | 3-A | 3-A |
| Thickness (μm) | — | — | 2.0 | 2.0 |
| Micro vickers hardness (kg/mm²) | — | — | 48 | 48 |
| Upper magnetic layer | 4-A | 4-A | 4-A | 4-A |
| Thickness (μm) | 0.2 | 2.2 | 1.2 | 1.0 |
| Yield (%) | 12 | 99 | 100 | 100 |
| Adhesive strength (g) | ≧100 | 17 | 35 | 55 |
| Electomagnetic characteristics |  |  |  |  |
| 7 MHz output (dB) | −2.5 | 4.1 | 4.5 | 7.0 |
| C/N ratio (dB) | −0.5 | 3.2 | 3.5 | 5.5 |
| Running durability | B | B | C | A |

|  | Comparative Example 8 | Example 6 |
|---|---|---|
| Non-magnetic support | A | A |
| Thickness (μm) | 4.5 | 4.5 |
| Micro vickers hardness (kg/mm²) | 93.7 | 93.7 |
| Undercoating layer | 3-D | 3-B |
| Thickness (∞m) | 2.0 | 2.0 |
| Micro vickers hardness (kg/mm²) | 51.2 | 42 |
| Upper magnetic layer | 4-A | 4-B |
| Thickness (μm) | 0.2 | 0.1 |
| Yield (%) | 99 | 99 |
| Adhesive strength (g) | 12 | 81 |
| Electromagnetic characteristics |  |  |
| 7 MHz output (dB) | 6.1 | 7.1 |
| C/N ratio (dB) | 5.2 | 6.0 |
| Running durability | C | A |

Table 1 show that the specimens of the present invention can be prepared in a high yield and exhibit a high adhesion between the non-magnetic support and the undercoating layer, a high 7 MHz output, a high CN ratio, and an excellent running durability. On the contrary, none of the comparative specimens satisfy all these requirements at the same time.

In the present invention, a magnetic recording medium comprising a non-magnetic support, an upper magnetic layer having a thickness of 0.05 to 1.0 μm and an undercoating layer having a thickness of 0.5 to 5.0 μm is provided wherein the total thickness of the magnetic recording medium is in the range of 4 to 10 μm, and the micro vickers hardness of the non-magnetic support and the undercoating layer are in the range of 75 to 100 kg/mm² and 25 to 50 kg/mm², respectively. The magnetic recording medium of the present invention exhibits good electromagnetic characteristics and suffers from little edge damage due to repeated running, showing an excellent running durability, and shows a good adhesion between the magnetic layer and the non-magnetic support that causes little powder peeling and hence little dropouts.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising a non-magnetic support having thereon, in this order, an adhesive layer comprising a polymer, an undercoating layer comprising an inorganic powder and a binder, and one or more magnetic layers each comprising a ferromagnetic powder and a binder, the thickness of said upper magnetic layer being in the range of 0.05 to 1.0 μm, the thickness of said undercoating layer being in the range of 0.5 to 5.0 μm, the total thickness of said magnetic recording medium being in the range of 4 to 10 μm, the micro vickers hardness of said non-magnetic support being in the range of 75 to 100 kg/mm², and the micro vickers hardness of said undercoating layer being in the range of 25 to 50 kg/mm².

2. A magnetic recording medium as claimed in claim 1, wherein said inorganic powder contained in said undercoating layer comprises at least one of a ferromagnetic powder and a non-magnetic metal oxide.

3. A magnetic recording medium as claimed in claim 2, wherein said ferromagnetic powder contained in said undercoating layer comprises Co-modified γ-iron oxide.

4. A magnetic recording medium as claimed in claim 2, wherein said non-magnetic metal oxide contained in said undercoating layer is selected from the group consisting of rutile titanium dioxide, anatase titanium dioxide, amorphous titanium dioxide, α-iron oxide, zinc oxide, barium sulfate and mixtures thereof.

5. A magnetic recording medium as claimed in claim 1, wherein said non-magnetic support comprises an aromatic polyamide.

6. A magnetic recording medium as claimed in claim 1, wherein said undercoating layer and at least the magnetic layer adjacent thereto are formed by a wet-on-wet coating method.

7. A magnetic recording medium as claimed in claim 1, wherein said polymer is selected from the group consisting of polyester polyurethane, polyether polyurethane, polyester, butadiene-acrylonitrile copolymer and styrene-butadiene copolymer.

8. A magnetic recording medium as claimed in claim 1, wherein said polymer has an average molecular weight of 3,000 to 100,000.

9. A magnetic recording medium as claimed in claim 1, wherein said polymer contains a polar group selected from the group consisting of a sulfonic acid group, a phosphoric acid group, a phosphate group and a sulfate group.

10. A magnetic recording medium as claimed in claim 1, wherein the polymer has a glass transition temperature in the range of −30° to 50° C.

11. A magnetic recording medium as claimed in claim 1, wherein said polymer is selected from polyester and polyester-polyurethane.

12. A magnetic recording medium as claimed in claim 1, wherein said adhesive layer has a thickness ranging from 0.01 to 0.5 μm.

13. A magnetic recording medium as claimed in claim 1, wherein said adhesive layer has a thickness ranging from 0.2 to 0.3 μm.

14. A magnetic recording medium as claimed in claim 1, wherein said medium further comprises a back coat layer provided on the opposite surface of the support to the surface having the magnetic layer.

15. A magnetic recording medium as claimed in claim 14, wherein said back coat layer has a thickness ranging from 0.1 to 2 μm.

16. A magnetic recording medium as claimed in claim 14, wherein said back coat layer comprises non-magnetic powder and a binder resin.

17. A magnetic recording medium as claimed in claim 16, wherein said non-magnetic powder in the back coat layer is selected from the group consisting of calcium carbonate, iron oxide, aluminum oxide, barium sulfate, titanium oxide, chromium oxide and silicon oxide.

18. A magnetic recording medium as claimed in claim 16, wherein said back coat layer further comprises carbon black or graphite.

19. A magnetic recording medium as claimed in claim 16, wherein said binder resin in the back coat layer is selected from the group consisting of vinyl chloride resins, polyurethane resins, phenoxy resins and epoxy resins.

* * * * *